United States Patent Office 3,594,121
Patented July 20, 1971

---

3,594,121
DRY GEL PROCESS FOR PREPARING ZEOLITE Y
Willis W. Weber, Niagara Falls, N.Y., assignor to Union
   Carbide Corporation, New York, N.Y.
No Drawing. Continuation-in-part of abandoned application Ser. No. 484,116, Aug. 31, 1965. This application
   Mar. 10, 1969, Ser. No. 805,888
Int. Cl. C01b 33/28
U.S. Cl. 23—111                                    4 Claims

ABSTRACT OF THE DISCLOSURE

Process for preparing zeolite Y using reaction mixture gels containing very low mole percentages of water and silica to the extent they contain so little water that they give the appearance of virtually dry to slightly moist powders. These gels permit the use of apparatus such as is conventionally used in dry solids handling.

---

This is a continuation-in-part application of application Ser. No. 484,116, filed Aug. 31, 1965 and now abandoned.

This invention relates in general to a process for preparing a crystalline zeolite of the molecular sieve type. More particularly, the invention relates to a process for preparing zeolite Y using reaction systems of very low silica and water content.

Zeolite Y is a synthetic aluminosilicate of the so-called molecular sieve type, characterized as consisting structurally of a three-dimensional framework of $SiO_4$ and $AlO_4$ tetrahedra cross-linked by the sharing of oxygen atoms and containing interstitial spaces capable of adsorbing molecules of certain critical dimensions. In terms of chemical composition, conventional as-crystallized zeolite Y is characterized by the following formula:

$$0.9 \pm 0.2 Na_2O : Al_2O_3 : wSiO_2 : xH_2O$$

wherein $w$ is a value greater than 3 up to about 6 and $x$ is a value up to 9. By treatment with acids or one of a variety of chelating agents such as acetylacetone, the value of $w$ can be substantially increased by selective removal of aluminum from the crystal structure without destroying the characteristic X-ray diffraction pattern of the as-produced crystal. Zeolite Y is described in detail in U.S. Pat. 3,130,007 issued Apr. 21, 1964, to D. W. Breck. Also described therein is the process for preparing zeolite Y which in general comprises aging, digesting and crystallizing an aqueous sodium aluminosilicate mixture, the reactant proportions of which in terms of moles of $Na_2O$, $H_2O$, $Al_2O_3$ and $SiO_2$ depend in the main upon the raw material selected as the source of silicon for the reaction system. For example, when sodium silicate, silica gels or silicic acid is employed as the source of silicon, the aqueous sodium aluminosilicate reaction system expressed in terms of oxide-mole-ratios should, as heretofore understood, fall within one of the ranges of Table B, below:

TABLE B

|  | Range a | Range b | Range c |
|---|---|---|---|
| $Na_2O/SiO_2$ | 0.6–1.0 | 1.05–1.7 | 1.9–2.1 |
| $SiO_2/Al_2O_3$ | 8–30 | 10–30 | ca. 10 |
| $H_2O/Na_2O$ | 12–90 | 20–90 | 40–90 |

When an aqueous colloidal silica sol or a reactive amorphous solid silica is used as the source of silicon, oxide-mole-ratios should be within the ranges of Table C below:

TABLE C

|  | Range d | Range e |
|---|---|---|
| $Na_2O/SiO_2$ | 0.28–0.30 | ca. 0.4 |
| $SiO_2/Al_2O_3$ | 8–10 | 10–27 |
| $H_2O/Na_2O$ | 30–50 | 30–50 |

Zeolite Y, although well recognized as one of the most versatile and efficient synthetic zeolites for both adsorption and catalysis purposes, have nevertheless remained one of the most difficult to produce consistently with high purity and in high yields based on starting materials. Accordingly, production costs have remained relatively high and the full commercial potential of the molecular sieve has not been realized.

It is therefore the general object of the present invention to provide a process for preparing zeolite Y from a reaction system having a more efficient gel composition which gives rise to a higher yield of zeolite Y per pound of silica reactant and increased volume efficiency for the apparatus than reaction systems heretofore employed.

This general object and others which will be obvious from the specification appearing hereinafter are accomplished in accordance with the process of the present invention which comprises forming an aqueous sodium aluminosilicate reaction mixture, the source of at least 80 mol percent of silica in said reaction mixture being a solid reactive amorphous silica and any remainder being sodium silicate, said reaction mixture having a composition expressed in terms of oxide-mole-ratios within the range:

$Na_2O/SiO_2$ _____ 0.2–<0.6
$SiO_2/Al_2O_3$ _____ 3.5–7
$H_2O/Na_2O$ _____ 7–18 maintaining said reactant mixtuer at about ambient temperature for at least 6 hours and heating said reactant mixture to a temperature within the range of from 80° C. to about 120° C. whereby zeolite Y is formed.

Because of the very low water content of the reaction systems of the present invention, the "gels" resulting from admixture of all the reactants have a consistency ranging from virtually dry powders to a somewhat moist powder similar to damp clay. It is for this reason that the present process has been termed a "dry-gel" process.

It was surprising to find, in view of the complex crystalline structure of zeolite Y, that a dry gel could provide a suitable medium for crystallization, and even more surprising to find that the yields of zeolite Y obtained thereby were quite high, i.e. ranging upward from about 60% to approximately 100% based on the total oxide in the reaction system. Moreover, the process eliminates four major problems encountered in conventional wet-gel methods, namely the dispersion of solid amorphous silica (when such is used as the source of silicon in the reaction system), the proportional mixing of gels, filtration of the reaction mass after crystallization has occurred, and disposal of the mother liquor. As a further advantage, the dry-gel process is suitable for continuous processing as distinguished from the batch operation universally employed when dealing with wet gels.

The solid reactive amorphous silica suitably employed in the present invention can be any of such materials as fume silicas and chemically precipitated silicas, preferably having an ultimate particle size of less than about 1 micron. These silicas are widely available commercially under such trade names as "Santocel," "Cab-O-Sil," "Hi-Sil" and "QUSO."

Compounds of aluminum which heretofore have been conventionally used to provide aluminum in reaction systems for preparing synthetic zeolitic molecular sieves in general are also suitable in the practice of the present invention. Specifically, activated alumina, gamma alumina, alumina trihydrate, alpha alumina and sodium aluminate have all been found satisfactory reagents with alumina trihydrate being preferably employed.

The source of sodium is preferably sodium hydroxide and can be used either as the sole source or, when required, as a supplement to sodium introduced as sodium silicate and/or sodium aluminate.

In combining the reactants to form the reaction system from which zeolite Y crystallizes, the order of mixing is not a critical factor. Preferably, however, to insure that the reaction system has a uniform composition throughout, it has been found desirable to form the final composition by admixing solid amorphous silica with a water solution of sodium aluminate, particularly where $H_2O$ to $Na_2O$ mole ratios of the reaction system are between about 7 and 13. Where sodium aluminate is employed as the source of aluminum, the water solution thereof is formed simply by adding a portion of the overall required quantity of water thereto. Where alumina or aluminum trihydrate is to be used, however, the sodium aluminate solution is prepared by dissolving this reagent in a water solution of sodium hydroxide at about 90° C. It is advantageous to cool the sodium aluminate solution thus formed to about 30° C. before admixture with the solid amorphous silica. For the heavier gel compositions resulting, a muller type of mixing device is preferable.

As in conventional prior known processes for preparing zeolite Y, it has been found advantageous to age the gel by permitting same to remain quiescent at ambient room temperatures (23° C.) for periods of about 8 to 48 hours. In general, the higher the silica/alumina ratio, the longer the aging period. Thereafter the temperature is raised to the range of about 80° C. to 120° C., preferably about 100° C., and digestion and crystallization allowed to take place over a period of about 48 hours. Digestion periods of as low as about 5 hours have been utilized but periods of about 20 to 48 hours are more preferred.

Crystals of the product zeolite Y are isolated when necessary by any convenient means such as filtration and washed with pure water until the wash water effluent has a pH value of less than about 8. The crystals are thereafter dried and activated at temperatures of about 300–450° C.

The following examples will serve to illustrate the process of this invention.

EXAMPLES 1–4

Using an amorphous solid silica (Hi–Sil 233, Pittsburgh Plate Glass Company) as the source of silicon, aluminum trihydrate as the source of aluminum, and sodium hydroxide (76 weight percent $Na_2O$) as the sodium source, and water, 4 reaction systems were prepared as follows:

A sufficient portion of the overall water content was used to dissolve the sodium hydroxide. The aluminum trihydrate was added to this solution and heated to 90° C. for a time sufficient to dissolve the aluminum trihydrate and form sodium aluminate with the available sodium. The silica was stirred into the remaining water and added to the sodium aluminate solution at a temperature of 30° C. Vigorous agitation with a pug mill or ribbon blender equipped with a cooling jacket was employed to obtain a uniform mixture. The resulting dry gels were aged between 8 and 48 hours at room temperature and then digested at 100° C. for 48 hours. The crystalline product (zeolite Y) was, depending on the caustic content, either washed to an effluent wash water pH of 8 and dried or subjected to no further treatment. In all cases the zeolite Y structure was established by conventional X-ray examination. The compositions of the respective reaction systems in terms of mole fractions and mole ratios of the oxides of sodium, aluminum, silicon and hydrogen, the approximate percentage of zeolite Y in the crystallized product and the $SiO_2/Al_2O_3$ ratio of the zeolite Y product are set forth in tabular form below.

| Example No. | Gel mole fraction | | | | Mole ratios | | | Product purity, percent | | Product $SiO_2/Al_2O$ |
|---|---|---|---|---|---|---|---|---|---|---|
| | $SiO_3$ | $Al_3O_3$ | $Na_2O$ | $H_2O$, mole/mole | $Na_2O/SiO_2$ | $SiO_2/Al_2O_3$ | $H_2O/Na_2O$ | By X-ray | By $O_2$ ads.[1] | |
| 1 | 0.570 | 0.130 | 0.300 | 2.5 | 0.526 | 4.38 | 8.34 | 95.8 | 98.0 | >3 |
| 2 | 0.702 | 0.106 | 0.192 | 3.0 | 0.346 | 6.62 | 15.61 | 100 | 94 | 4.60 |
| 3 | 0.702 | 0.106 | 0.192 | 3.5 | 0.346 | 6.62 | 18.22 | 97.8 | 91.2 | 4.49 |
| 4 | 0.702 | 0.106 | 0.192 | 2.5 | 0.274 | 6.67 | 13 | 100 | 88 | 4.76 |

[1] 100% zeolite Y=34.5% $O_2$ adsorption at 100 mm. Hg and −183° C.

What is claimed:

1. Process for preparing crystalline zeolite Y which comprises forming an aqueous aluminosilicate reaction mixture, the source of at least 80 mol percent of silica in said reaction mixture being a solid reactive amorphous silica and any remainder being sodium silicate, said reaction mixture having a composition expressed in terms of oxide-mole-ratios within the range:

$Na_2O/SiO_2$ ---------------------------------- 0.2–<0.6
$SiO_2/Al_2O_3$ ---------------------------------- 3.5–7
$H_2O/Na_2O$ ---------------------------------- 7–18 maintaining said reactant mixture at about ambient room temperature for at least about 6 hours, and thereafter heating said reaction mixture to a temperature within the range of from about 80° C. to about 120° C. whereby zeolite Y is formed.

2. Process according to claim 1 wherein the reaction mixture is maintained at ambient room temperature for a period from about 8 to 48 hours before the temperature is raised to within the range of 80° C. to 120° C.

3. Process according to claim 1 wherein the reaction mixture composition expressed in terms of oxide mole ratios is within the range:

$Na_2O/SiO_2$ ---------------------------------- 0.2–<0.6
$SiO_2/Al_2O_3$ ---------------------------------- 3.5–7
$H_2O/Na_2O$ ---------------------------------- 8–13

4. Process according to claim 1 wherein the ingredients admixed to form the reaction mixture are solid amorphous silica, water, sodium hydroxide and alumina trihydrate.

References Cited

UNITED STATES PATENTS

| | | | |
|---|---|---|---|
| 2,841,471 | 7/1958 | Sensel | 23—112 |
| 3,130,007 | 4/1964 | Breck | 23—113 |
| 3,310,373 | 3/1967 | Johnson | 23—112 |
| 3,343,913 | 9/1967 | Robson | 23—113 |

EDWARD J. MEROS, Primary Examiner

U.S. Cl. X.R.

23—112